Figure 1:
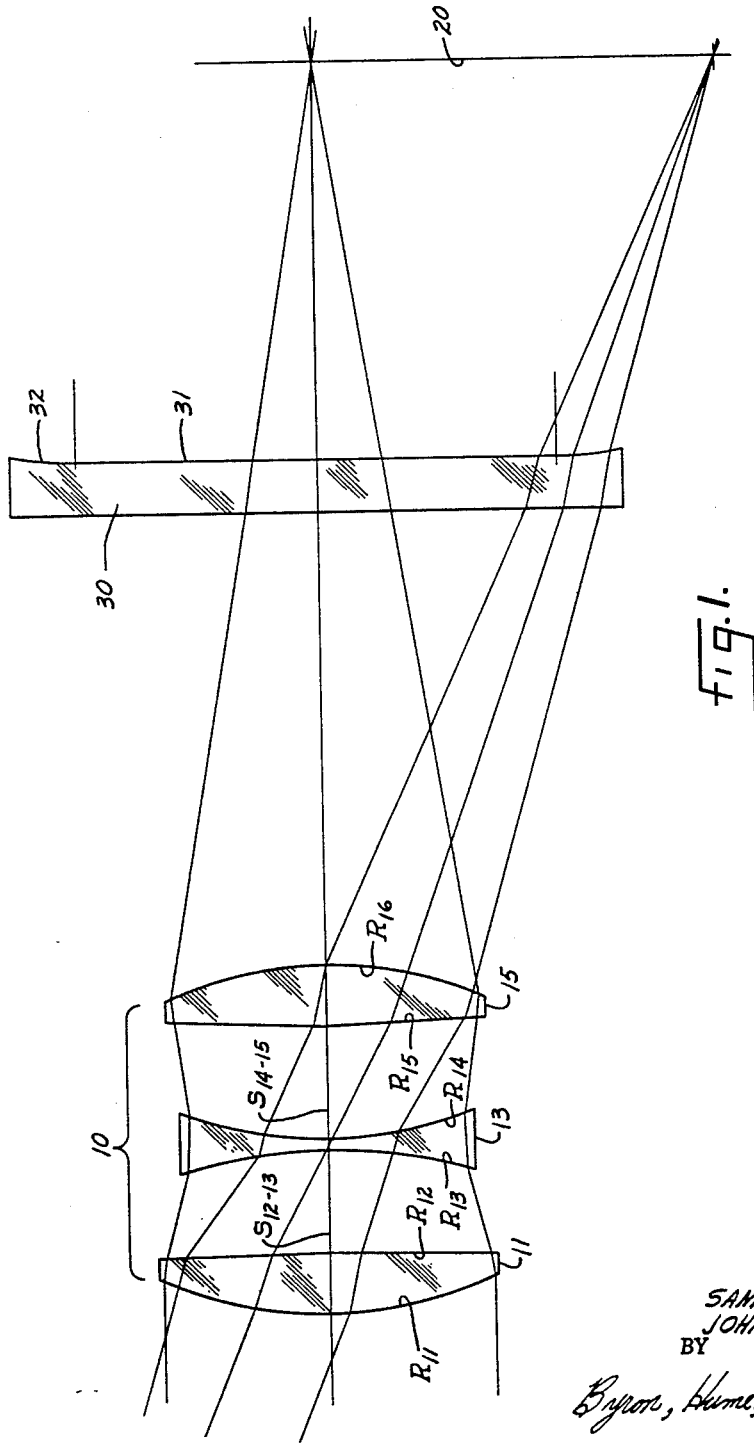

April 10, 1962   S. BOUSKY ETAL   3,028,793
HIGH EDGE DEFINITION LENS
Filed Nov. 15, 1957

INVENTORS.
SAMUEL BOUSKY,
JOHN R. MILES,
BY
Byron, Hume, Groen and Clement
ATTORNEYS.

ved Apr. 10, 1962

3,028,793
HIGH EDGE DEFINITION LENS
Samuel Bousky, River Grove, and John R. Miles, Glenview, Ill., assignors, by mesne assignments, to Chicago Aerial Industries, Inc., Melrose Park, Ill., a corporation of Delaware
Filed Nov. 15, 1957, Ser. No. 696,689
3 Claims. (Cl. 88—57)

This invention pertains to aerial photographic lenses and in particular to means for improving the definition in the areas of the field away from the center of the field of such a lens.

In aerial photography the objective lens which produces a photograph with the greatest amount of detail generally is considered the best objective lens. This is similar to pictorial photography, although there is a considerable distinction between the two types of photography. In pictorial photography any large area of low quality definition will render a photograph unusable. However, in aerial photography this is not always true because each photograph is generally combined with a series of photographs to form a composite or a mosaic. Each of these photographs is generally one of a series of photographs taken of a particular object or series of objects. The photographs are so taken that each photograph will generally overlap in subject matter with those photographs adjacent thereto.

Now, if a part of each photograph is of low quality, it may be possible to arrange the series in an overlapping fashion in such a manner that the poor quality portion is substantially deleted in each photograph.

Presently in commercial aerial photography the practice is to use an objective lens that will give a relatively high definition portion near the center of the photograph and a relatively low definition portion adjacent the edges of the photograph. The low definition portion is generally large in area, in proportion to the high definition portion as will be explained later on. Such photographs are then arranged in overlapping fashion so that all but the relatively high definition portion of each photograph is blocked out. Thus in forming the composite photograph or mosaic only a small part of each photograph is used. Therefore, an object of the invention is to provide means for improving the average definition of an aerial photographic lens assembly that is novel.

Another object of the invention is to provide a lens assembly that will provide a relatively high definition portion adjacent the edges of the image area.

Another object of the invention is to provide a lens assembly that will provide an image having a relatively large percentage of area having a relatively high definition, These and other objects of the invention will be apparent upon development of the specification with reference to the drawing.

In the drawing:
FIGURE 1 is a diagrammatic illustration of one example of the lens assembly embodying the invention.

As was explained previously, the present practice in aerial photography is to take a series of photographs of the area to be photographed. Each of these photographs overlaps both the preceding and succeeding photographs in the series in photographic content. In fact, generally the photographs are taken in such rapid succession that each photograph may overlap two or more of both the preceding and succeeding photographs. The photographs are then overlapped to form a composite or mosaic in such a manner that the relatively high definition portion of each photograph is utilized. Generally this portion is only a relatively small part of the photograph so that it takes a large number of photographs to form the composite.

The value of the invention can best be understood by considering an aerial photograph having an overall diameter of 6 inches and dividing it into three zones, i.e., a central zone having a diameter of 2 inches and an annular zone contiguous with the central zone having an outside diameter of 4 inches and a second annular zone contiguous with the first annular zone having an outside diameter of 6 inches. The areas of each of the three zones is 3.14 square inches, 9.42 square inches, and 15.7 square inches respectively, or a total of 28.26 square inches. It can now be seen that if the lens system can be modified so that it produces a high definition portion adjacent to the periphery of the photograph instead of the center portion, the amount of information per unit of diameter is considerably greater. Referring back to the example, it can now be seen that there is five times as much information in the peripheral annulus as in the central zone.

A still further factor that must be considered is that present commercial lenses are generally better at the center of the field than they need to be and are below requirement at the edge of the field. Thus if the lens could be modified so that the definition of the edge could be improved, even if it were at the expense of the definition of the center portion, then it would follow that a greater percentage of the photograph could be used.

For example, if the definition of the center portion is arbitrarily considered as 100 percent, that at the periphery would be approximately 20 percent with the ordinary photographic objective. Now, if it were determined that 60 percent is the most efficient definition, then it would follow that if the definition at the edge could be raised to 60 percent, even though the definition at the center was decreased some unknown amount, as long as this amount was less than 40 percent, then substantially the entire photograph could be used.

Referring now to the drawing, the lens system includes an ordinary triplet photographic objective generally designated by the numeral 10 and a focal plane 20 at which is located a photographic sensing element. The invention is in no manner limited to this type of an objective and other types may be used. An aspheric corrector plate 30 having a substantially flat central portion 31 and a modified annular portion 32 is optically aligned with the objective A as shown in the drawing. The annular portion 32 has a curved cross section so as to correct for field curvature and coma which are generally uncorrected for the ordinary aerial photographic objectives at the edge. In the correction of these aberrations near the edge of the field it is recognized that some of the rays which pass through the center of the field are affected adversely by this corrector plate, resulting in a slight loss in quality at the center of the field. However, as was mentioned previously, generally the quality of the center portion is better than it need be so that a slight diminution in quality at the center of the field will not seriously affect the quality of the photograph over all.

It should be pointed out that the equivalent of a series of the aspheric corrector plates 30 may be used. One equivalent would consist of a corrector plate having a series of zones each of which would correct a specific annular portion of the field that would be contiguous with the annular portions corrected by the preceding and succeeding corrector zones. The number of zones that could be used in any one device is unlimited except for the practicality of such a structure. In this case the cross section of the plate may not be regular, depending upon the amount of correction to be made in any one zone.

A specific example of the invention will now be briefly described. A triplet photographic objective similar to that shown in the drawing, having the characteristics listed in the following table was selected:

| Lens | Radii | Thickness | Diameter | Index of Refraction Sodium "D" Light | Reciprocal Dispersion Ratio |
|---|---|---|---|---|---|
| #11 | $R_{11}=+40.1$ $R_{12}=-537$ | $R_{11-12}=6$ $S_{12-13}=10$ | 33.5 | 1.613 | 58.5 |
| #13 | $R_{13}=-47$ $R_{14}=+40$ | $R_{13-14}=1$ $S_{14-15}=10.8$ | 29 | 1.621 | 36.2 |
| #15 | $R_{15}=+234.5$ $R_{16}=-37.9$ | $R_{15-16}=6$ | 31 | 1.613 | 58.5 |

Field curvature=+.4
Coma=+.014
Focal length=100.

An aspheric corrector plate having a thickness of 5 units at the center was located substantially 44 units from the photographic objective and 38 units from the final focal plane. The aspheric corrector plate had a diameter of 60 units and the surface nearest the objective lens assembly was substantially flat. The surface nearest the final focal plane had a relatively flat area 31 which was 47 units in diameter and an annular area having a curved surface 32 between the flat portion and the outer edge. The annular area had a radius of curvature equal to substantially 38,462 units with the center of this radius of curvature located at a point substantially 23.5 units from the axis of the aspheric corrector plate on the same side as the curvature. The glass from which the aspheric corrector plate was constructed had a refractive index of 1.517 in sodium "D" light and a reciprocal dispersion ratio of 64.5. The field curvature and coma of the photographic objective prior to correction in the manner previously described was .4 unit and .014 unit respectively. After correction both the field curvature and the coma were reduced to substantially less than .002 unit. This improvement in the field curvature and the coma was in an annular zone approximately 2 units in cross section in the final focal plane.

It can now be seen that if the aspheric corrector plate were further modified in the manner previously described or a series of aspheric corrector plates were used, a substantial portion of the photograph could be improved in a like manner.

Although certain specific terminology was used in the specification, it is to be understood that this is merely by way of example and not to be construed as a limitation. It is contemplated that certain modifications may be made within the scope of the claims without departing from the spirit of the invention.

We claim:
1. A photographic device comprising a photographic objective lens assembly, means for supporting a photographic recording medium at the focal plane of said objective lens assembly, a refractive lens intermediate said objective lens assembly and said focal plane and optically aligned therewith, said objective lens assembly having a focal length of 100 units, said refractive lens having a thickness of 5 units and being located at 44 units from said lens assembly and 38.5 units from said focal plane, said refractive lens having a substantially flat front surface and a used diameter of 60 units, said refractive means having a rear surface comprising a substantially flat uncorrected area 47 units in diameter and a corrected annular zone between said 47 unit diameter and said 60 unit diameter, said annular zone being curved on its rear surface with a radius of curvature of 38,462 units with the center of the radius of curvature being 23.5 units from the axis of said refracting lens and on the same side of said refractive lens as said focal plane whereby the field curvature and coma of the portion of said lens assembly optically aligned with said refractive lens are reduced.

2. A photographic device comprising a photographic objective lens assembly, means for supporting a photographic recording medium at the focal plane of said objective lens assembly, an aspheric corrector lens intermediate said objective lens assembly and said focal plane and optically aligned therewith, said objective lens assembly having a focal length of 100 units, said refractive lens having a thickness of 5 units and being located at 44 units from said lens assembly and 38.5 units from said focal plane, said aspheric corrector lens having a substantially flat front surface and a used diameter of 60 units, said aspheric corrector lens having a rear surface comprising a substantially flat area 47 units in diameter and an annular zone between said 47 unit diameter and said 60 unit diameter, said annular zone being curved on its rear surface with a radius of curvature of 38,462 units with the center of the radius of curvature being 23.5 units from the axis of said aspheric corrector lens and on the same side of said aspheric corrector lens as said focal plane whereby the field curvature and coma of the portion of said lens assembly optically aligned with said aspheric corrector lens are reduced to less than .002 unit.

3. A photographic device comprising a photographic objective lens assembly, means for supporting a photographic recording medium at the focal plane of said objective lens assembly, an aspheric corrector lens intermediate said objective lens assembly and said focal plane and optically aligned therewith, said objective lens assembly having a focal length of 100 units, said aspheric corrector lens having a thickness of 5 units and being located at 44 units from said lens assembly and 38.5 units from said focal plane, said aspheric corrector lens having a substantially flat front surface and a used diameter of 60 units, said aspheric corrector lens having an index of refraction of 1.517 and a reciprocal dispersion ratio of 64.5, said aspheric corrector lens having a rear surface comprising a substantially flat area 47 units in diameter and an annular zone between said 47 unit diameter and said 60 unit diameter, said annular zone being curved on its rear surface with a radius of curvature of 38,462 units with the center of the radius of curvature being 23.5 units from the axis of said aspheric corrector lens and on the same side of said aspheric corrector lens as said focal plane whereby the field curvature and coma of the portion of said lens assembly optically aligned with said aspheric corrector lens are reduced to less than .002 unit.

References Cited in the file of this patent
UNITED STATES PATENTS

| | | |
|---|---|---|
| 2,100,290 | Lee | Nov. 23, 1937 |
| 2,377,268 | Rinia | May 29, 1945 |
| 2,380,887 | Warmisham | July 31, 1945 |
| 2,430,150 | Warmisham | Nov. 4, 1947 |
| 2,730,925 | Kavanagh | Jan. 17, 1956 |
| 2,803,996 | Bouwers | Aug. 27, 1957 |
| 2,803,997 | Hopkins | Aug. 27, 1957 |